Figure 1:
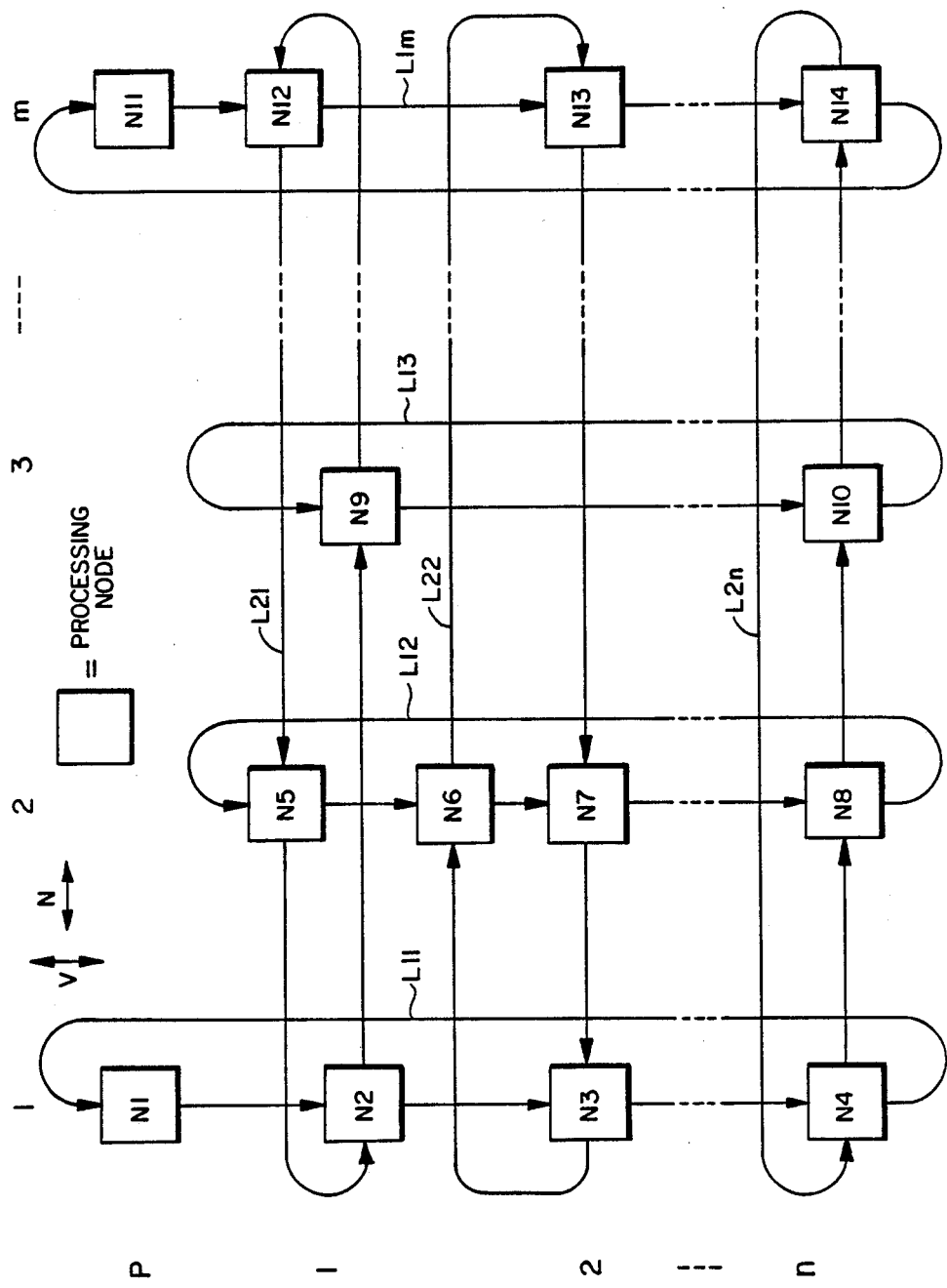

United States Patent [19]
Bobey et al.

[11] Patent Number: 4,736,465
[45] Date of Patent: Apr. 5, 1988

[54] COMMUNICATIONS NETWORK

[75] Inventors: Kenneth A. Bobey, Edmonton; John C. Ellson, Sherwood Park, both of Canada

[73] Assignee: Northern Telecom Limited, Montreal, Canada

[21] Appl. No.: 760,006

[22] Filed: Jul. 29, 1985

[51] Int. Cl.$^4$ ................................................. H04B 9/00
[52] U.S. Cl. ...................................... 455/612; 455/601; 455/606; 370/88; 340/825.05
[58] Field of Search ............... 455/606, 612, 601, 607, 455/610; 370/86, 88; 340/625.05

[56] References Cited

U.S. PATENT DOCUMENTS

| | | | |
|---|---|---|---|
| 3,742,144 | 6/1973 | Brandenburg et al. | 370/88 |
| 3,794,983 | 2/1974 | Sahin | 370/54 |
| 4,596,013 | 6/1986 | Tashiro et al. | 370/86 |
| 4,672,373 | 6/1987 | Mori et al. | 370/86 |

FOREIGN PATENT DOCUMENTS

| | | | |
|---|---|---|---|
| 0075748 | 6/1981 | Japan | 370/88 |
| 0117452 | 9/1981 | Japan | 370/86 |

OTHER PUBLICATIONS

Braun et al., "Silk-Concept and General System Design", *Hasler Review;* vol. 14; No. 1; Spring 1981; pp. 3-7.

Primary Examiner—Robert L. Griffin
Assistant Examiner—Andrew J. Telesz, Jr.
Attorney, Agent, or Firm—R. John Haley

[57] ABSTRACT

A digital optical fiber communications system includes a plurality of communications nodes, each of which may include a processor, at each of a plurality of different locations. For packet data communications among the processors, a communications network comprises a first set of unidirectional communications loops, each at a respective location for communications among the processors at the respective location, and a second set of unidirectional communications loops, multiplexed onto the optical fiber channels, for communications among processors at different locations. Data packets are broadcast on both sets of loops throughout the network so that they reach all processors even in the presence of severe failures among the optical fiber channels, thereby providing a very reliable processor communications facility.

14 Claims, 2 Drawing Sheets

COMMUNICATIONS NETWORK

This invention relates to communications networks, and is particularly concerned with a communications network for providing communications among processing means at a plurality of nodes at each of a plurality of locations.

It is known to provide high speed transmission channels, for example using optical fiber digital transmission at high bit rates, in a communications or signal transmission system. In such a system it is also known to provide a so-called protection channel which is used in place of a regular, or so-called working, channel, in the event of a fault or failure on one of the working channels. The switching of traffic from a working channel to the protection channel is termed protection switching, and is effected under the control of processors which are provided at least at the ends or terminal locations of the communications system.

In order to avoid undue loss of transmitted information, protection switching must be effected rapidly, and information relating to the switching must be communicated among all of the processors which may be involved in controlling protection switching. For this information, and for other information which it is desirable to transmit among processors at nodes at a plurality of locations of a communications system, a high speed communications network is required among the processors.

It is also known to provide such a processor communications network via the transmission channels themselves. For example, in a transmission system operating at a bit rate of about 570 Mb/s, about 6 Mb/s of the transmission bandwidth may be provided for overhead information, and one-eighth of this may be used for processor communications at a bit rate of about 830 kb/s. While this is a particularly convenient manner of providing for processor communications, it poses the problem of maintaining processor communications in the presence of faults and failures in various parts of the transmission system.

In addition, the provision of processor communications should satisfy other requirements, such as minimizing time demands on the processors themselves, so that each processor's capacity is properly available for other tasks, and not restricting the overall configuration of the system, so that arbitrary configurations and extensions of the system can be accommodated.

An object of this invention, therefore, is to provide an improved communications network.

According to one aspect of this invention there is provided a communications network, for providing communications among processing means at a plurality of nodes at each of a plurality of locations, comprising: a plurality of first unidirectional communications loops, each at a respective location for providing a unidirectional communications path among the processing means at the respective location; and at least one second unidirectional communications loop providing a unidirectional communications path among a plurality of processing means at different locations; at least one processing means at each location thereby being coupled to one of the first and one of the second unidirectional communications loops, each such processing means including means for supplying the same information to both of the unidirectional communications loops to which it is coupled, and means for receiving information from each of the unidirectional communications loops to which it is coupled.

The network preferably comprises a plurality of the second loops, and preferably each processing means which is coupled to one of the second loops is coupled to only one of the second loops. Conveniently the second loops are coupled with alternating communications directions to those processing means which are coupled consecutively to at least one of the first loops.

Such a network can provide a high speed and very reliable communications facility among the processing means, particularly using packet data communications in accordance with a bit oriented protocol such as HDLC. Accordingly, each processing means preferably comprises means for transmitting information to and receiving information from each unidirectional communications loop to which it is coupled in the form of data packets in accordance with a bit oriented protocol. Advantageously each processing means comprises a microprocessor, a serial communications controller for handling the data packet communications, a memory for storing signals, and means for coupling signals therebetween for direct memory access to the memory by the serial communications controller.

The invention is particularly, but not exclusively, applicable to a communications system comprising a plurality of communications nodes at each of a plurality of locations and a plurality of communications channels, for example optical fiber channels carrying digital signals, extending between nodes at different locations, at least some of the nodes including processing means, and a communications network as recited above for providing communications among the processing means, the second unidirectional communications loops being provided on the communications channels.

Figure 2:
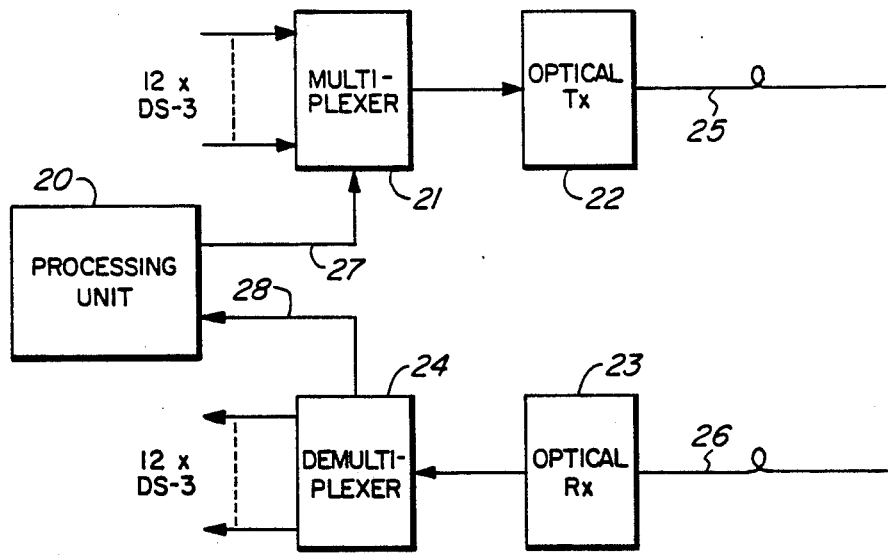
Figure 3:
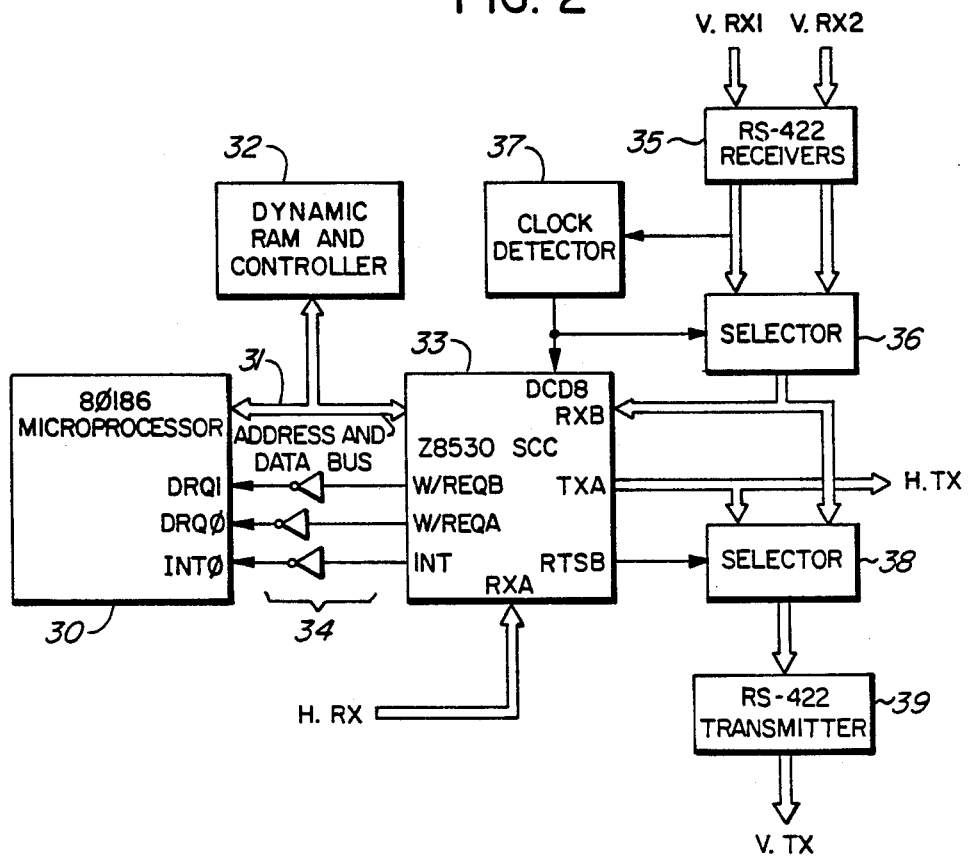

The invention will be further understood from the following description with reference to the accompanying drawings, in which:

FIG. 1 schematically illustrates a communications network in accordance with an embodiment of this invention;

FIG. 2 is a block schematic illustration of components associated with each processing node in the network of FIG. 1; and FIG. 3 schematically illustrates parts of a processing unit shown in FIG. 2.

Referring to FIG. 1, there is shown a communications network among processor nodes in a communications system having 1+n channels referenced P, 1, 2, ... n linking m different locations 1, 2, 3, ... m. Before describing the network of FIG. 1, the communications system itself is described.

The communications system incorporating the communications network is assumed to be an optical fiber communications system with 1+n fibers traversing the m locations in each direction between terminal or end locations 1 and m. For example n is in the range from 1 to 11 and m is in the range from 2 to 32. The 1+n fibers thus provide n working channels and one protection channel which is indicated by the reference P in FIG. 1.

Each channel carries signals at a bit rate of about 570 Mb/s, which can comprise 12 DS-3 rate signals and overhead information at a bit rate of 6 Mb/s. The overhead information rate of 6 Mb/s is divided into 8 categories, one of which is allocated to the communications network and has a bit rate of about 830 kb/s.

At each of the terminal locations 1 and m each pair of fibers, corresponding to an individual channel for the two directions of transmission, is coupled to an optical transmitter and an optical receiver associated with a processor, constituting a processing node. At intermediate locations the channels may be glassed-through, repeatered, or provided with a drop-and-insert capability, as discussed further below. Processors associated with the channels at repeater and drop-and-insert locations also constitute processing nodes. For convenience and clarity, in the following description the two fibers corresponding to an individual channel for the two directions of transmission are referred to as the forward channel and the reverse channel.

Referring to FIG. 1, processing nodes for the protection channel P and three working channels 1, 2, and n are shown at four locations 1, 2, 3, and m. FIG. 1 also illustrates the communications network which is provided to link these processing nodes at the bit rate of 830 kb/s described above. It is important to note that FIG. 1 does not attempt to represent the fibers themselves, but only the communications network provided on the fibers. For example, the protection channel P has forward and reverse channels between the locations 1 and m via the intermediate locations 2 and 3, but this is not shown in FIG. 1 because the protection channel is not used for the communications network unless a protection switch has taken place.

For convenience the individual processing nodes shown in FIG. 1 are arbitrarily referenced N1 to N14.

The communications network links the nodes N1 to N14 with two sets of unidirectional communications loops, the loops of the first set being referenced L11 to L1m and the loops of the second set being referenced L21 to L2n. As can be appreciated from these references and as is clearly shown in FIG. 1, each unidirectional communications loop in the first set links together all of the processing nodes at a respective location, and each unidirectional communications loop in the second set links together all of the processing nodes for a respective channel.

Thus the nodes N1 to N4 at location 1 are linked together by the loop L11 of the first set of loops, the nodes N5 to NB at location 2 are linked by the loop L12 of the first set of loops, and so on. The nodes N2, N5, N9, and N12 for the working channel 1 are linked by the loop L21 of the second set of loops, the nodes N3, N6, N7, and N13 for the working channel 2 are linked by the loop L22 of the second set of loops, and the nodes N4, N8, N10, and N14 for the working channel n are linked by the loop L2n of the second set of loops. The nodes N1 and N11 for the protection channel P are not linked by a loop of the second set.

It follows from the above description that each of the nodes associated with a working channel is included in one unidirectional communications loop of the first set and one unidirectional communications loop of the second set, and consequently has two receive ports and two transmit ports associated with the communications network. Because of the physical arrangement which the processing nodes would normally have, arranged in shelves in a rack one above another, the receive and transmit ports for the respective loop of the first set are referred to as the vertical receive and transmit ports respectively, and the ports for the respective loop of the second set are referred to as the horizontal receive and transmit ports. Arrows referenced V and H in FIG. 1 represent this notation. Because the nodes N1 and N11 associated with the protection channel P are each connected in only one communications loop, they each use only the vertical receive and transmit ports.

Each loop in the first set of unidirectional communications loops L11 to L1m is constituted by cables between the processing nodes at the respective location, coupled to the processing units via RS-422 interfaces in the manner described in detail below with reference to FIG. 3. Each loop in the second set of unidirectional communications loops L21 to L2n is constituted by the 830 kb/s bandwidth of the overhead information for the respective forward and reverse channels. The overhead information is provided on and extracted from the forward and reverse channels in the manner described below with reference to FIG. 2.

FIG. 1 illustrates various possible arrangements for the individual unidirectional communications loops. As shown in FIG. 1, all of the loops L11 to L1m of the first set have the same arrangement, passing consecutively via any processing nodes associated with the channels P, 1, 2, ... n respectively with the vertical transmit port of each processing node being connected to the vertical receive port of the next processing node in sequence. The loop is in each case completed by connecting the vertical transmit port of the last processing node in the sequence to the vertical receive port of the first processing node. This arrangement provides a particularly convenient coupling between the different processing nodes at any location, which is consistent between the different locations. However, alternative arrangements, similar to or different from those described below for the second set of loops, may instead be provided. In any case, if a location includes only one processing node then its vertical transmit port can be simply coupled back to its vertical receive port.

The number of processing nodes present at any particular location is dependent upon the nature of the signal handling which may take place at the location. Thus for example each of the terminal locations 1 and m includes a processing node in respect of each working channel and the protection channel. Location 3 represents a repeater location at which processing nodes N9 and N10 are provided only for the repeatered working channels 1 and 3. Processing nodes N5 and NB are similarly provided for these working channels at location 2. Location 2 also provides a drop-and-insert capability for the working channel 2, whereby some or all of the signals on each of the forward and reverse channel paths may be tapped off and replaced by locally supplied signals. To this end the working channel has associated with it at location 2 two processing nodes N6 and N7, one in respect of each transmission direction.

As shown in FIG. 1 for the working channel n and the loop L2n, the loop may pass via all of the processing nodes N4, N8, N10 and N14 at the successive locations in sequence on the forward channel, looping back directly from the node N14 to the node N4 on the reverse channel. This provides a particularly convenient arrangement of the communications network if all of the second loops are similarly arranged but with the loops in alternately opposite directions; for example with all second loops for odd-numbered channels as shown in FIG. 1 for the channel n, and with all second loops for even-numbered channels passing via the processing nodes sequentially for the reverse channel and directly from the location 1 to the location m on the forward channel. This is as shown in FIG. 1 for the working channel 2 and the nodes N13, N7, and N3, except that in this case the node N6 is also connected in the forward channel to accommodate the two nodes N6 and N7 provided at location 2 for the channel 2.

An alternative arrangement, which provides a reduced overall store-and-forward delay for end-to-end packet transmission, is shown for the nodes N2, N5, N9, and N12 and the loop L21. In this case the nodes at the successive locations are connected alternately in the forward channel and reverse channel parts of the loop for the working channel 1.

Having described the overall arrangement of the communications network, the manner in which packets are transmitted between nodes will now be described.

Each node which originates or receives, via either receive port, (for the first time) a packet stores a checksum and the source node of the packet. Subsequently received packets have their checksum and source node compared with the stored values and are discarded in the event of a match, as they are then established as being duplicates of packets which have already been handled. A node receiving a non-duplicate packet processes the packet if it is intended for this node, and/or retransmits the packet via both of its transmit ports if the packet is intended to be forwarded. In general, each node will receive two copies of each packet, one via each of its two receive ports, and will discard the duplicate packet which arrives last. All packets will be received by all of the nodes in this manner.

This duplication of packets provides a particularly robust communications network which provides a high degree of reliability even in the presence of multiple failures and breaks in the communications system as a whole.

In order to illustrate the above explanation, the following example is given for transmission of a data packet from the node N2 to the node N13. From the source node N2, the packet is transmitted to the nodes N3 and N9. From the node N3 the packet is forwarded to the nodes N4 and N6, and from the node N9 the packet is forwarded to the nodes N10 and N12. The packet will be forwarded from the node N4 to the nodes N1 and N8, from the node N6 to the nodes N7 and N13 (the destination node), and from the node N10 to the nodes N9 (where it is discarded as being a duplicate) and N14, and from the node N12 to the nodes N5 and N13 (the destination node). Subsequent forwarding of the packet results in duplicates being received, these being discarded, except for forwarding from the node N14 to the node N11, whereby the packet has reached all of the nodes. The destination node N13 processes the first copy of the packet which it receives, and discards the second, duplicate, copy of the packet as described above.

Suppose now that an extreme failure situation exists in which failures exist for example on the forward channels from node N9 to node N12, from node N6 to node N13, and from node N8 to node N10, and on the reverse channel from node N14 to node N4. Even in such an unlikely and severe situation, a packet transmitted for example from node N2 can reach all of the nodes, reaching node N13 via nodes N9, N10, N14, N11, and N12. Likewise, a packet transmitted from node N13 can still reach all nodes, reaching for example node N2 via nodes N7, N8, and N5. This illustrates the robustness and reliability of the communications network.

Referring now to FIG. 2, the manner in which the overhead information, including the data packets on the second set of unidirectional communications loops described above, is inserted on and extracted from the forward and reverse channels is described.

FIG. 2 illustrates components at a processing node, showing for example an arrangement of such components for the forward and reverse channel at a terminal location. Similar sorts of arrangements, with similar components, exist at other processing nodes. In each case the components comprise a processing unit 20, a multiplexer 21, an optical transmitter 22, an optical receiver 23, and a demultiplexer 24. As illustrated in FIG. 2, the transmitter 22 supplies optical signals to a forward channel fiber 25, and the receiver 23 receives optical signals from a reverse channel fiber 26. The multiplexer 21 multiplexes twelve synchronous DS-3 rate bit streams with the overhead information supplied from the processing unit 20 via a line 27 to produce a multiplexed signal at a bit rate of about 570 Mb/s, which it supplies to the transmitter 22 for transmission. Conversely, the demultiplexer 24 demultiplexes the signal from the receiver 23 to produce twelve DS-3 rate bit streams and overhead information which it supplies to the processing unit via a line 28.

FIG. 3 illustrates the processing unit 20 of FIG. 2, showing only those parts which are directly related to the communications network. Other parts of the unit, for example clock circuitry, which are necessary but which can be provided in well-known manner, are not shown. In addition, for simplicity FIG. 3 does not show details of the individual transmit and receive ports, each of which comprises separate data and clock lines.

As shown in FIG. 3, each processing unit 20 includes an Intel type 80186 microprocessor 30 which is coupled via an address and data bus 31 to a dynamic RAM (random access memory) and controller 32 and to an Advanced Micro Devices type Z8530serial communications controller (SCC) 33. The SCC 33 provides two full-duplex (i.e. transmit TX and receive RX) communications ports A and B at a bit rate of up to 1 Mb/s, and serves as a controller for the vertical and horizontal transmit and receive ports. In this embodiment of the invention the SCC transmit port TXB is unused; the SCC transmit port TXA is coupled to the horizontal and vertical transmit ports of the processing node, this being possible because the node transmits the same information via both ports; and the SCC receive ports RXA and RXB are coupled respectively to the horizontal and vertical receive ports. This is described further below.

The SCC 33 handles in known manner all of the functions associated with the packet communications in accordance with the HDLC Protocol, such as framing of packets so that they are bounded by flag bytes, zero bit insertion and deletion, and cyclical redundancy code generation and checking, so that the microprocessor 30 is relieved of these tasks. Data is transferred at high speed between the SCC 33 and the RAM 32 using DMA (direct memory access) in known manner. To this end control and status bit registers of the SCC are mapped into the I/O (input/output) address space of the microprocessor. In addition, an interrupt output INT and respective write request channel outputs W/REQA and W/REQB of the SCC 33 are connected via respective inverters 34 to an interrupt input INT0 and DMA channel request inputs DRQ0 and DRQ1 of the microprocessor 30, the microprocessor thereby receiving and processing one interrupt for each data packet which is received or transmitted.

From the above description it will be seen that the microprocessor 30 provides for two DMA channels, whereas the SCC 33 uses three communications ports which may require access to the DMA channels. In order to resolve the consequent contention which arises among the communications ports for the DMA channels, a method of sharing a DMA channel for transmitting and receiving packets is used. This method is described in detail and is claimed in a U.S. Pat. No. 4,637,015 issued Jan. 13, 1987 and entitled "Packet Transmission and Reception via a Shared DMA Channel", to which reference is directed in this respect.

In essence, the method of resolving contention for the DMA channels comprises adopting a protocol in which an HDLC abort signal is transmitted before transmission of each data packet, with a delay therebetween substantially equal to the packet turnaround delay for transmission of packets in the network. On receipt of the abort signal, a DMA channel is reserved for receiving the subsequent packet, with a time-out period in case the packet is not transmitted. Even if a DMA channel is engaged in transmission of a current packet when the abort signal is received, the presence of the turnaround delay before the packet following this abort signal ensures that the DMA channel can be received following its release at the end of the transmission of this current packet.

As shown in FIG. 3, the horizontal receive port H.RX, generally corresponding to the line 28 in FIG. 2, is coupled directly to the SCC port RXA, and the horizontal transmit port H.TX, generally corresponding to the line 27 in FIG. 2, is coupled directly to the SCC port TXA. In the event of a failure of the processing node, information at the port H.RX is coupled directly to the port H.TX by hardware in the multiplexer 21 and demultiplexer 24 (FIG. 2) which is not shown in detail. Thus a bypass of information in the horizontal direction, i.e. on the relevant one of the second set of unidirectional communications loops of the communications network, is provided around a failed processing node.

A bypass of information in the vertical direction, i.e. on the relevant one of the first set of unidirectional communications loops, is also provided around a failed processing node. This is achieved in the manner described below.

The SCC port RXB is normally supplied with information from the preceding processing node in the respective unidirectional communications loop of the first set via a first vertical receive port V.RX1, connected to the vertical transmit port of this preceding processing node via cabling on which signals are transmitted in accordance with the RS-422 standard, an RS-422 receiver in a block 35, and a selector 36. A clock detector 37, which is conveniently constituted by a retriggerable monostable circuit, monitors the clock line between the RS-422 receiver and the selector 36 to control the selector 36. In the event of a failure of the clock signal on the monitored line, the detector 37 controls the selector 36 to supply to the SCC port RXB signals received via another RS-422 receiver in the block 35 from a second vertical receive port V.RX2 instead of the signals from the port V.RX1. The detector 37 output is also supplied to an input DCDB of the SCC 33 whereby notification of this change can be communicated to the microprocessor 30. The port V.RX2 is connected via cabling to the vertical transmit port of the second preceding processing node in the respective unidirectional communications loop of the first set of loops in the communications network. Thus in each location each processing node is bypassed by cabling coupling the vertical transmit port of the preceding processing node directly to the port V.RX2 of the following processing node, in addition to having its port V.RX1 connected to the vertical transmit port of the preceding processing node and having its vertical transmit port connected to the port V.RX1 of the following processing node.

The vertical transmit port V.TX of the processing node is normally supplied with the same signals from the SCC port TXA as are supplied to the horizontal transmit port H.TX, via a selector 38 and an RS-422 transmitter 39. The selector 38 is controlled by an output RTSB of the SCC 33 so that, in the event of a failure within the processing node itself, it instead supplies to the port V.TX via the transmitter 39 the incoming signals received via the selector 36.

Although a particular embodiment of the invention has been described in detail, it should be understood that the invention is not limited to this, and many changes may be made. For example, while the arrangement shown in FIG. 1 provides a particularly robust and reliable processor communications network, this may be modified in many ways. In particular, the n loops L21 to L2n in the second set of loops could be replaced by a smaller number of loops, for example by a single such loop, and/or by loops individual ones of which do not extend from one end location to the other. In addition, while the network has been described in the context of a communications system having forward and reverse channels between two end or terminal locations, the invention is equally applicable in the context of other arrangements, for example a communications system having channels arranged in a loop.

Furthermore, although in the above description the port TXB of the SCC 33 is unused, this need not be the case. In particular, in a communications system in which n=1, so that there are only two channels, the two channels may be fully redundant in which case all of the SCC ports may be used.

Numerous other modifications, variations, and adaptations which may occur to those skilled in the art to which the invention relates may be made without departing from the scope of the invention as defined in the claims.

What is claimed is:

1. A communications network, for providing communications among processing means at a plurality of nodes at each of a plurality of locations, comprising:
   a plurality of first unidirectional communications loops, each at a respective location for providing a unidirectional communications path among the processing means at the respective location; and
   a plurality of second unidirectional communications loops each providing a unidirectional communications path among a plurality of processing means at different locations;
   at least one processing means at each location thereby being coupled to one of the first and one of the second unidirectional communications loops, each such processing means including means for supplying the same information simultaneously to both of the unidirectional communications loops to which it is coupled, and means for receiving information from each of the unidirectional communication loops to which it is coupled.

2. A communications network as claimed in claim 1 wherein each processing means which is coupled to one of the second unidirectional communications loops is coupled to only one of the second unidirectional communications loops.

3. A communications network as claimed in claim 2 wherein at least two processing means which are coupled consecutively to a first unidirectional comnunications loop are coupled to second unidirectional communications loops having different communications directions.

4. A communications network as claimed in claim 1 wherein each processing means comprises means for transmitting information to and receiving information from each unidirectional communications loop to which it is coupled in the form of data packets in accordance with a bit oriented protocol.

5. A communications network as claimed in claim 4 wherein each processing means comprises a microprocessor, a serial communications controller for handling data packet comnunications, a memory for storing signals, and means coupling the microprocessor, serial communications controller, and memory together for direct memory access to the memory by the serial communications controller.

6. A communications network as claimed in claim 1 and including means for bypassing at least one of the first unidirectional communications loops around eachof the processing means to which the loop is coupled.

7. A communications network as claimed in claim 6 wherein the means for bypassing comprises, for each processing means, means for coupling first unidirectional communications loop outputs of two preceding processing means of the respective loop to respective first unidirectional communications loop inputs of the processing means, and means for selecting between said inputs.

8. A communications network as claimed in claim 1 wherein all of the processing means at at least one location are coupled to different ones of the second unidirectional communications loops.

9. A communications network as claimed in claim 1 and including means for bypassing at least one of the first unidirectional communications loops around at least one of the processing means to which the loop is coupled.

10. A communications network as claimed in claim 1 wherein at least two of the first unidirectional communications loops have different numbers of processing means coupled thereto.

11. A communications system comprising a plurality of communications nodes at each of a plurality of locations and a plurality of communications channels extending between nodes at different locations, at least some of the nodes including processing means, and a communications network for providing communications among the processing means, the communications network comprising:

at each location, a first unidirectional communications loop coupling together the processing means at that location; and a plurality of second unidirectional communication loops, provided on said communications channels, each coupling together a plurality of processing means at different locations;

at least one processing means at each location thereby being coupled to one of the first and one of the second unidirectional communications loops, each such processing means including means for supplying the same information simultaneously to both of the loops to which it is coupled, and means for receiving information from each of the loops to which it is coupled.

12. A communications system as claimed in claim 11 wherein each of the communications channels comprises an optical fiber communications channel via which digital signals are transmitted.

13. A communications system as claimed in claim 11 wherein at least two of first unidirectional communications loops have different numbers of processing means coupled thereto.

14. A method of communicating information among a plurality of processing means at each of a plurality of locations, the processing means being coupled together via a plurality of first communications loops, each at a respective location for providing communications among the processing means at the respective location, and a plurality of second communications loops each for providing communications among a plurality of the processing means at different locations, comprising the steps of:

supplying information to be communicated from a processing means simultaneously to all communications loops to which it is coupled; and in each processing means, receiving information from each communications loop to which the processing means is coupled and, if it is not a duplicate of information previously supplied from that processing means, supplying the same information simultaneously to all communications loops to which the processing means is coupled.

* * * * *